(12) United States Patent
Wolfgram

(10) Patent No.: US 7,944,669 B2
(45) Date of Patent: May 17, 2011

(54) ELECTRIC FENCE ENERGIZER LIGHTNING PROTECTION

(75) Inventor: Kirk W. Wolfgram, Rochester, MN (US)

(73) Assignee: Zareba Systems, Inc., Lititz, PA (US)

( * ) Notice: Subject to any disclaimer, the term of this patent is extended or adjusted under 35 U.S.C. 154(b) by 694 days.

(21) Appl. No.: 11/771,749

(22) Filed: Jun. 29, 2007

(65) Prior Publication Data

US 2009/0002912 A1    Jan. 1, 2009

(51) Int. Cl.
| | |
|---|---|
| *H02H 1/00* | (2006.01) |
| *H02H 1/04* | (2006.01) |
| *H02H 3/22* | (2006.01) |
| *H02H 9/06* | (2006.01) |
| *A01K 3/00* | (2006.01) |
| *F41B 15/04* | (2006.01) |
| *H01T 23/00* | (2006.01) |

(52) U.S. Cl. .......... 361/117; 361/232; 256/10; 340/510; 340/649

(58) Field of Classification Search .................. 361/117, 361/232; 256/10; 340/564
See application file for complete search history.

(56) References Cited

U.S. PATENT DOCUMENTS

| | | | |
|---|---|---|---|
| 3,246,206 A | 4/1966 | Chowdhuri | |
| 3,581,299 A | 5/1971 | Schmit | |
| 3,655,994 A * | 4/1972 | Malme | 307/132 R |
| 3,868,545 A | 2/1975 | Caron | |
| 4,288,830 A | 9/1981 | Brasfield | |
| 4,323,942 A | 4/1982 | Hartman et al. | |
| 4,440,980 A | 4/1984 | Bakker | |
| 4,577,255 A | 3/1986 | Martin | |
| 4,661,878 A | 4/1987 | Brown et al. | |
| 4,695,916 A | 9/1987 | Satoh et al. | |
| 4,725,825 A | 2/1988 | McKean | |
| 4,809,324 A | 2/1989 | Bender | |
| 4,849,846 A | 7/1989 | Hung et al. | |
| 4,903,295 A | 2/1990 | Shannon et al. | |
| 4,939,618 A | 7/1990 | Fingerson et al. | |
| 5,767,592 A | 6/1998 | Boys et al. | |
| 6,680,839 B2 | 1/2004 | Napiorkowski | |
| 6,707,171 B1 | 3/2004 | Huenner et al. | |
| 2009/0002912 A1* | 1/2009 | Wolfgram | 361/126 |

* cited by examiner

*Primary Examiner* — Dharti H Patel
(74) *Attorney, Agent, or Firm* — Jacobson Holman PLLC

(57) ABSTRACT

A lightning protection circuit for electric fence energizers used with electric fencing systems is provided. The circuit includes a protective combination having at least two electrical components connected in series. The protective combination allows induced voltage from lightning strikes to be effectively spread across a first of the electrical components and a switch of the fence energizer, so as to limit peak levels of current drawn to a second of the electrical components.

24 Claims, 4 Drawing Sheets

ELECTRIC FENCE ENERGIZER LIGHTNING PROTECTION

TECHNICAL FIELD

Embodiments of the present invention pertain to electric fencing systems and electric fence energizers used therewith, and particularly, to over-voltage protection circuits for such electric fence energizers for lightning strikes induced on the fence wire.

BACKGROUND

For years, electric fences have been used in agriculture settings for the purpose of containing livestock and/or repelling predators. Generally, the electric fences involve non-insulated fence wire being suspended in the air through the use of insulated members (e.g., made of plastic, porcelain, etc.) and being energized by an electric fence controller or energizer. The electric fence energizer is generally provided with two output terminals. In one typical configuration, one of the terminals is connected to the electric fence wire while the other terminal is connected to Earth ground. In turn, any animal that comes in contact with the fence wire while simultaneously being in contact with the ground receives an electric shock. Alternatively, the electric fence energizer's output terminals may be connected to two fence wires positioned one above the other. In turn, any animal coming in contact with both fence wires simultaneously receives an electric shock.

As is known, the majority of present electric fence energizers employ capacitive discharge systems. The primary elements of such systems include (i) a capacitor (or bank of capacitors), (ii) a step-up transformer, and (iii) a switch such as a silicon controlled rectifier (SCR). During normal operation of these systems, the capacitor is charged to a DC voltage over a period of time (e.g., typically about one second), and upon activation of the switch, is discharged rapidly through a primary winding of the transformer. The result is a high voltage pulse (e.g., typically around 10,000 volts DC) on the transformer's secondary winding, which is, in turn, applied to the fence wire for the purpose of deterring animals.

During a lightning strike, voltage can be induced onto the fence wire and back to the secondary winding of the step-up transformer. As a result of the induced voltage from the lightning, the transformer is subjected to very high voltages. While fence energizer transformers in the past may have become routinely damaged from such voltage levels, fence energizer are now commonly equipped with transformers that can withstand tens of thousands of volts. Consequently, fence energizer transformers are commonly found capable of withstanding voltages in excess of 25,000 volts.

As described above, the transformer in an electric fence energizer is configured to step up the voltage from a capacitor during normal operation; however, the reverse functioning also applies for the transformer. That is, when lightning induces a voltage on the fence wire and secondary winding of the step-up transformer, the transformer functions to step down the induced voltage on to the primary winding of the transformer. Unfortunately, while transformers designed to withstand the induced voltages from lightning strikes are commonly used in fence energizers, the transformers offer little to no protection to the circuitry on the primary side of the transformer, as described below.

In low power electric fence energizer designs, the transformer's primary to secondary turns ratio is generally high (e.g., in many typical designs, the turns ratio is around 1:50). Consequently, voltage induced on the primary winding from a lightning strike would be relatively low (e.g., using an exemplary turns ratio of 1:50, a 25,0000 volt surge induced on the fence wire/secondary winding would result in about 500 volts on the primary winding). Thus, in such a low power circuit, the energizer switch on the primary side of the transformer would only need to withstand induced voltages ranging in hundreds of volts given a 25 KV surge from the fence wire. Because switches designed to withstand several hundred volts are commercially available (e.g., an 800 volt SCR is common), no additional lightning protection circuit is typically needed with this type of low power energizer. However, in higher power fence energizer designs, the transformer's primary to secondary turns ratio is generally much lower (e.g., in many typical designs, the turns ration is around 1:10). Thus, given the same 25,000 volt surge on the fence wire and transformer secondary winding, the primary winding will have an induced voltage of 2,500 volts. Switches (such as SCRs) can be typically found to withstand voltages as high as 1000 volts; however, switches with higher voltage ratings are quite expensive.

Given the above, there have been a wide variety of circuit designs used in high power fence energizers to address the induced voltages coming back through the transformer from lightning strikes. In particular, these designs have generally involved using electronic protection devices within the circuitry on the transformer's primary side to limit the amount of induced voltage that the energizer switch sees. Unfortunately, each of these circuitry designs has been found to have shortcomings, as described below.

For example, one method of lightning protection for the primary-side circuitry has involved electrically connecting several switches, e.g., SCRs, in series to withstand higher voltages being induced from lightning strikes. Unfortunately, the use of series-connected switches generally requires a trigger circuit to fire all the switches at once during normal operation and would add considerable cost to the product. Other methods of lightning protection have involved electrically connecting electronic protection devices across the transformer's primary winding and/or the energizer switch, with such devices including Metal Oxide Varistors (MOVs), Transient Voltage Suppressors (TVSs), and diodes. However, these methods have also been found to have drawbacks, as described below.

Use of MOVs is generally limited to smaller devices as larger devices (and their associated higher junction capacitance) are found to cause small current spikes in the energizer switch, which can damage the switch during normal operation. Further, MOVs wear out with use. In turn, as surges are diverted during the operation of the MOV, the life span of the MOV shortens, and failure becomes imminent. TVS devices are similar to MOVs in function. As such, TVS devices again offer limited protection, yet with considerable cost. In comparison to MOVs or TVS devices, a diode placed across the SCR or transformer's primary winding represents the lowest cost option, while providing some protection. Unfortunately, while the MOV and TVS devices remain off until the voltage on the transformer's primary winding is high enough to cause the devices to turn on, the diode turns on immediately. This provides good protection for the energizer switch initially, but is also found to create extremely high currents in the diode (e.g., quite often, several hundred amperes), thereby causing the diode to quickly fail due to overcurrent.

Therefore, it would be advantageous to provide a lightning protection circuit for an electric fence energizer that addresses one or more of the above limitations.

SUMMARY

In accordance with the present invention, there are several embodiments disclosed of lightning protection circuits for electric fence energizers used with electric fencing systems. Each circuit includes a protective combination having at least two electrical components connected in series. The protective combination allows induced voltage from lightning strikes to be effectively spread across a first of the electrical components and a switch of the fence energizer, so as to limit peak levels of current drawn to a second of the electrical components.

In one embodiment, a lightning protection circuit for an electric fence energizer of an electrical fencing system is provided. The circuit comprises a step-up transformer having a primary winding and a secondary winding, a storage capacitor, a switch, and a protective combination. The secondary winding is operatively connected to a fence wire of the fencing system. The storage capacitor on one end shares an operative connection to the primary winding of the transformer and an input of the circuit that is operatively connected to a power source. The switch is operatively connected to the primary winding of the transformer. The switch when open facilitates the capacitor to charge via its operative connection to the power source. The switch when closed facilitates the capacitor to discharge its stored voltage across the primary winding. The protective combination is comprised of at least two electrical components connected in series and shares with the switch the operative connection to the primary winding of the transformer. A first of the electrical components is configured to draw a majority of current therethrough and away from the switch when voltage on the primary winding of the transformer is induced from a lightning strike on the fence wire. A second of the electrical components is configured to share the induced voltage with the switch, thereby reducing peak levels of the current drawn by the first electrical component.

In another embodiment, a lightning protection circuit for an electric fence energizer of an electrical fencing system is provided. The circuit comprises a step-up transformer having a primary winding and a secondary winding, a storage capacitor, a switch, and a protective combination. The secondary winding is operatively connected to a fence wire of a fencing system. The storage capacitor on one end shares an operative connection to the primary winding of the transformer and an input of the circuit that is operatively connected to a power source. The switch is electrically connected to the primary winding of the transformer. The switch when open facilitates the capacitor to charge via its operative connection to the power source. The switch when closed facilitates the capacitor to discharge its stored voltage across the primary winding. The protective combination is comprised of at least two electrical components connected in series, and shares with the switch the operative connection to the primary winding of the transformer. A first of the electrical components is configured to draw a majority of current therethrough when voltage on the primary winding of the transformer is induced from a lightning strike on the fence wire. A second of the electrical components is configured to share the induced voltage with the switch. The second electrical component is sized so that the switch begins to overvoltage at approximately the same time the first electrical component begins to overcurrent, thereby creating a balanced protective functioning of the circuit following lightning strikes contacting the fence wire.

In a further embodiment, a method of protecting an electric fence energizer circuit from lighting strikes is provided. One step of the method is operatively connecting a secondary winding of a step-up transformer to a fence wire of an electric fencing system. Another step is operatively connecting a storage capacitor on one end to a primary winding of the transformer and an input of the circuit that is operatively connected to a power source. An additional step is operatively connecting a switch to the primary winding of the transformer. The switch when open facilitates the capacitor to charge via its operative connection to the power source, and the switch when closed facilitates the capacitor to discharge its stored voltage across the primary winding. A further step is operatively connecting a protective combination so as to share with the switch the operative connection to the primary winding of the transformer. The protective combination is comprised of at least two electrical components connected in series. A first of the electrical components is configured to draw a majority of current therethrough when voltage on the primary winding of the transformer is induced from a lightning strike on the fence wire. A second of the electrical components is configured to share the induced voltage with the switch. The second electrical component is sized so that the switch begins to overvoltage at about the same time the first electrical component begins to overcurrent, thereby creating a balanced protective functioning of the circuit following lightning strikes contacting the fence wire.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides practical illustrations for implementing exemplary embodiments of the present invention. In the foregoing detailed description, the invention has been described with reference to specific embodiments. However, it may be appreciated that various modifications and changes can be made without departing from the scope of the invention as set forth in the appended claims.

Figure 1:
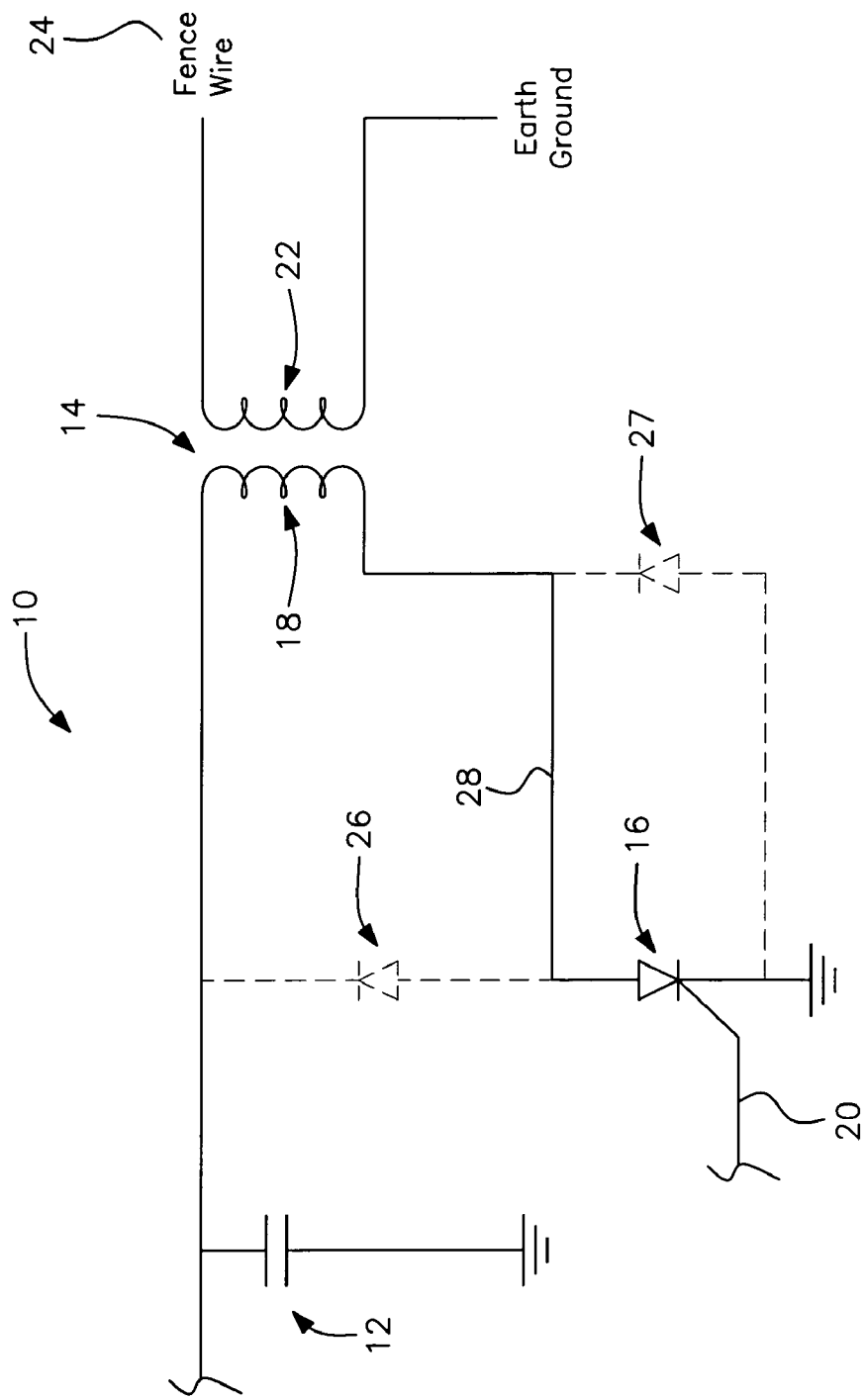
FIG. 1 is a partial diagram of a conventional fence energizer circuit.

FIG. 1 illustrates a partial diagram of a conventional fence energizer circuit. As shown, the circuit 10 is a capacitive discharge circuit. As such, the circuit 10 includes a capacitor 12, a step-up transformer 14, and a switch 16. As illustrated, the capacitor 12 on one end is operatively connected to a power supply (not shown) and connected to a primary winding 18 of the transformer 14, and on the other end is connected to ground. The switch 16, exemplarily shown as a silicon controlled rectifier (SCR), is used in the circuit 10 to control charging and discharging of the capacitor 12. As shown, the switch 16 is electrically connected to a timer (not shown) via a control lead 20, whereby the timer controls the activation schedule of the switch 16. As should be appreciated, in normal operation of the circuit 10, when the switch 16 is deactivated, the capacitor 12 is charged from the power supply.

Conversely, when the switch 16 is activated, the capacitor 12 is discharged through the primary winding 18 of the transformer 14. In turn, the voltage is stepped up onto a secondary winding 22 of the transformer 14 and applied to fence wire 24.

As described above, conventional fence energizer circuits, such as the circuit 10 of FIG. 1, often include an electronic device on the primary side of the step-up transformer to protect the energizer circuitry, namely the energizer switch 16, from induced voltage stemming from lightning strikes entering from the fence terminal. Such an electronic device is exemplarily represented in dashed lines in the circuit 10 of FIG. 1 as diode 26 and/or diode 27; however, as described above, each of these protection devices may alternately involve other protective devices, such as MOVs, TVSs, etc. As should be appreciated, in the normal operation of the circuit 10, upon activation of the switch 16, the diode 26 would serve to block current flow to node 28, thereby directing the capacitor 12 to directly discharge into the primary winding 18 of the transformer 14. Further, following a lighting strike, when voltage induced on the fence wire 24 and the secondary winding 22 is stepped down onto the primary winding 18, current is largely directed from node 28 through the diode 26, thereby protecting the energizer switch 16 from high levels of voltage stemming from the lightning strike.

Quite often, electrical protection from lightning strikes in fence energizer circuits is only positioned across the primary winding of the transformer to account for induced voltage of one polarity, e.g., a positive polarity; however, in many cases, the voltage induced from the lightning strike can alternatively be of an opposite polarity, e.g., a negative polarity. Therefore, the diode 27 can be positioned across the energizer switch 16 to account for protection of the switch 16 from such induced voltage of opposite polarity. In turn, diodes 26 and 27 can be included in the circuit 10 to provide over-voltage protection of either polarity of induced voltage stemming from a lightning strike on the fence wire 24.

Unfortunately, when used in protecting the fence energizer switch, diodes, as well as other electrical protection devices such as MOVs and TVSs, have limitations. For example, as described above, it is often found that these protective devices are not intended to be used in such high power applications. As such, even when the devices provide adequate protection initially, the devices are quickly found to fail due to excess voltage and/or current levels. For example, with reference to FIG. 1, following a lightning strike on the fence wire 24, while current is largely driven from the primary winding 18 of the transformer 14 through the diode 26 (or the diode 27), the current is often found to quickly reach levels that cause the diode 26 (or the diode 27) to fail. In some cases, this initial protection provided by the diode 26 (or the diode 27) may be long enough in keeping the energizer switch 16 safe from the induced voltage stemming from the lightning strike, but in other cases, the diode 26 (or the diode 27) may fail and short due to over-current, thereby causing the energizer circuit 10 to stop operating.

Figure 2:
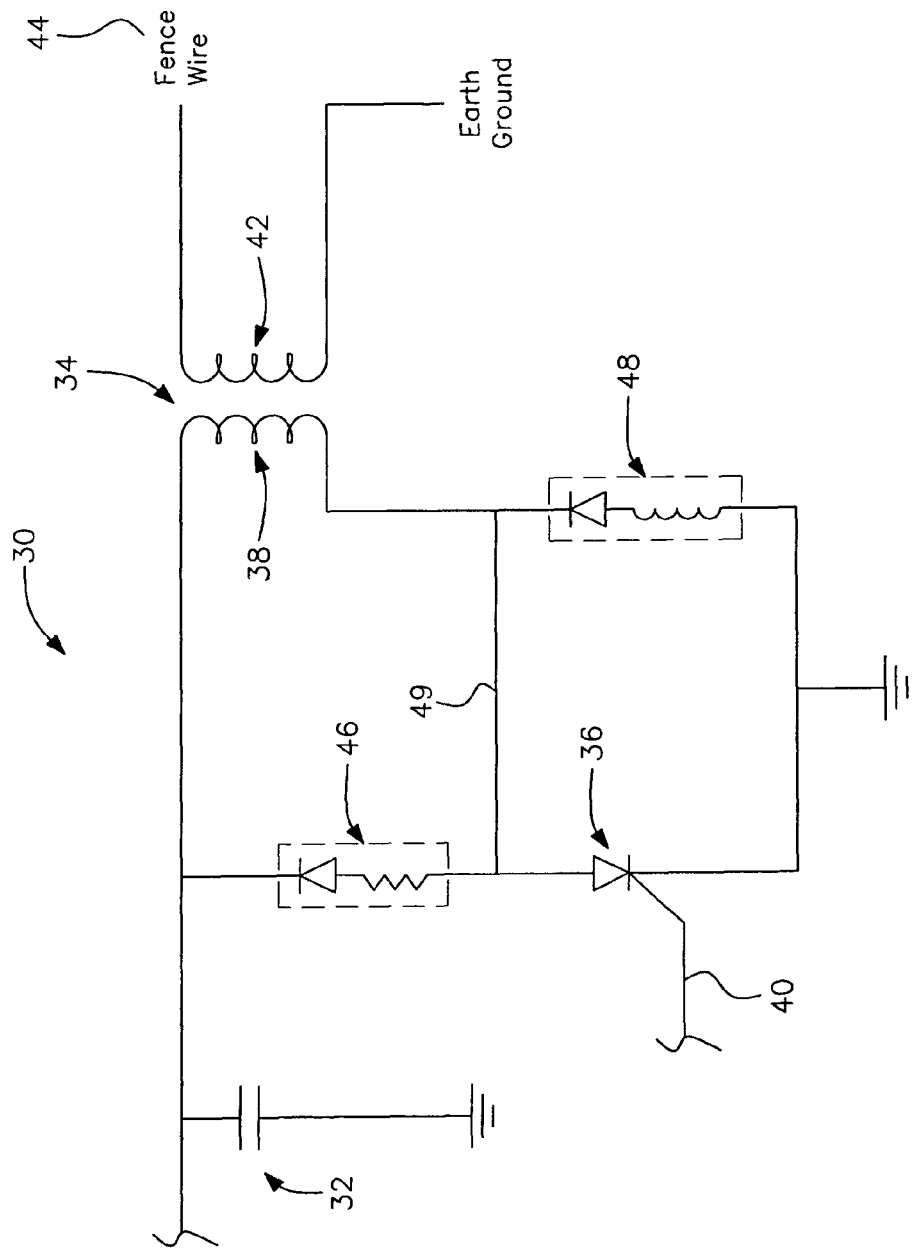
FIG. 2 is a partial diagram of a fence energizer circuit in accordance with certain embodiments of the invention.

Embodiments of the invention are provided to address the above shortcomings. FIG. 2 shows a partial diagram of a fence energizer circuit in accordance with certain embodiments of the invention. Similar to the circuit 10 of FIG. 1, the circuit 30 of FIG. 2 is a capacitive discharge circuit. As such, the circuit 30 includes a capacitor 32, a step-up transformer 34, and a switch 36. While the capacitor 32 is provided singly in the circuit 30, it could just as well be provided as a bank of capacitors without departing from the spirit of the invention. Similar to that described above for the circuit 10 of FIG. 1, the capacitor 32 on one end is operatively connected to a power supply (not shown) and connected to a primary winding 38 of the transformer 34, and on the other end is connected to ground. In addition, the switch 36, exemplarily shown as a silicon controlled rectifier (SCR), is used in the circuit 30 to control charging and discharging of the capacitor 32. In certain embodiments, the switch 36 is electrically connected to a timer (not shown) via a control lead 40, whereby the timer controls the activation schedule of the switch 36. As should be appreciated, the switch 36 can just as well be represented by a switching device other than a SCR without departing from the spirit of the invention. Further, other means of activating the switch 36 (besides a timer) can be just as well substituted as generally known by the skilled artisan. Similar to that described in the circuit 10 of FIG. 1, in normal operation of the circuit 30, when the switch 36 is deactivated, the capacitor 32 is charged from the power supply. Conversely, when the switch 36 is activated, the capacitor 32 is discharged through the primary winding 38 of the transformer 34. In turn, the voltage is stepped up onto a secondary winding 42 of the transformer 34 and applied to fence wire 44.

As should be appreciated, the primary distinction between the circuit 10 of FIG. 1 and the circuit 30 of FIG. 2 is the inclusion of blocks 46 and 48 in the circuit 30. In particular, the blocks 46 and 48 each represent an electrical combination collectively used in protecting the energizer switch 36 from induced voltage stemming from lightning strikes. As shown, block 46 is connected across the primary winding 38 of the transformer 34 (with connection to node 49), and block 48 is connected across the energizer switch 36 (also with connection to node 49). As described above, the voltage induced from the lightning strike can be one of a positive or negative polarity. Therefore, block 48 can be connected across the energizer switch 36 to account for protection of the switch 36 from such induced voltage of opposite polarity. In turn, blocks 46 and 48 can be included in the circuit 30 to provide over-voltage protection of either polarity of induced voltage stemming from a lightning strike on the fence wire 44, as further described below.

While the energizer switch 36 and blocks 46 and 48, for sake of clarity to the reader, are illustrated and described herein as having direct, or unmediated, connections with the node 49, the invention should not be limited to such. Instead, as should be appreciated, the connections for the energizer switch 36 and blocks 46 and 48, may be indirect, or mediated, while still falling within the spirit of the invention. As used herein, the term "operatively connected" shall refer to connections that may be direct or indirect.

In certain embodiments, each of the blocks 46 and 48 includes both a diode and a current limiting means electrically connected in series. Such current limiting means may include at least one resistor, at least one inductor, or a combination of resistor(s) and inductor(s). While resistors and/or inductors are exemplified as being preferable current limiting means, embodiments of the invention should not be limited to either. Instead, any other current limiting means which functions in a similar manner would be applicable, while still not departing from the spirit of the invention.

As should be appreciated, in each of the blocks 46 and 48, current in the circuit 30 is made to flow through the current limiting means and through the diode. The diode and current limiting means are electrically connected to the circuit 30 in a manner so that the anode of one of the diodes and the cathode of the other diode are directed toward the node 49. However, which of the diodes corresponds to block 46 and which corresponds to block 48 depends on the polarity of the energizer switch 36 relative to node 49. For example, if the anode of the switch 36 is directed toward the node 49, the diode and current limiting means corresponding to block 46 will be positioned so that the diode's anode is directed toward the node 49, while in block 48, the diode's cathode is toward the node 49. In contrast, for circuits of opposite polarity where the switch 36 is connected with its cathode directed toward the node 49, the diode and current limiting means corresponding to block 46 will be positioned so that the diode's cathode is directed toward the node 49, while in block 48, the diode's anode is toward the node 49.

Thus, at least one of the blocks 46 and 48 included in the circuit 30 is used in providing over-voltage protection from induced voltage stemming from a lightning strike on the fence wire 44, depending on the polarity of the induced voltage. For example, following a lighting strike, when a voltage of positive polarity induced on the fence wire 44 and the secondary winding 42 is stepped down onto the primary winding 38, current is largely directed from node 50 through block 46, thereby protecting the energizer switch 16 from overvoltaging. On the other hand, if a voltage of negative polarity is induced on the fence wire 44, current is largely directed through block 48, again protecting the energizer switch 16 from overvoltaging.

In describing the over-voltage protective functioning of the circuit 30, it would appear that blocks 46 and 48 closely resemble circuits implementing electrical protective devices which have been described above and used in conventional fence energizers. However, one of the primary differences is the fashion in which the current limiting means and diode combinations of each of blocks 46 and 48 function as compared to these conventional protective devices. As described above, the conventional protective devices primarily function alone in protecting the energizer circuitry, namely the energizer switch 36. In turn, as these devices fail due to high over-voltage or high-current levels, the energizer switch 36 is subsequently left unprotected and susceptible to any high voltage that remains from the lightning strike, or the devices fail in such a way (e.g., shorting) that the energizer circuit stops operating. In contrast, the diode and current limiting means in each of blocks 46 and 48 function in combination not only with each other, but also with the energizer switch 36, as further detailed below.

Figure 3:
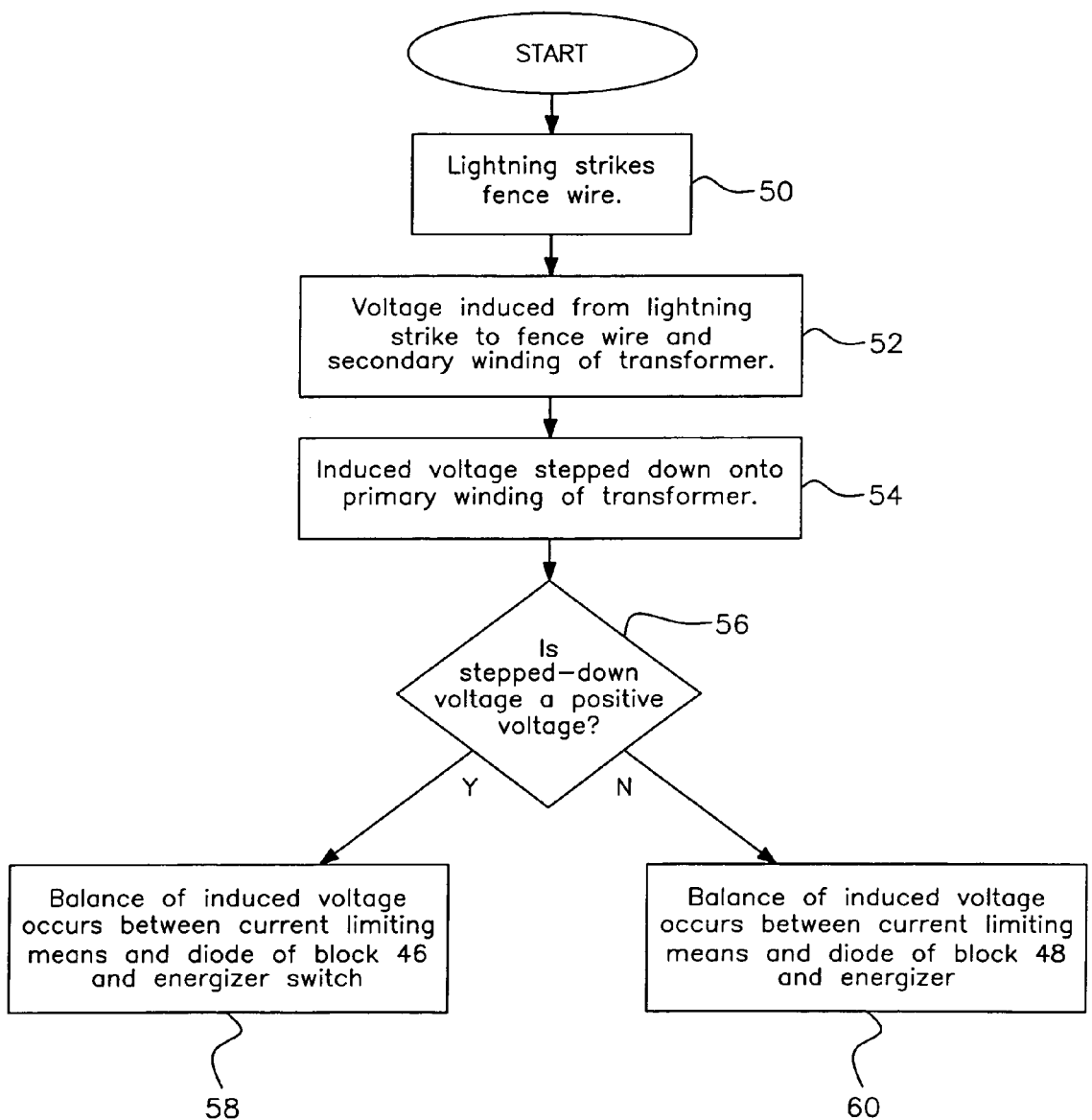
FIG. 3 is a flowchart depicting steps of the functioning of the circuit of FIG. 2 following a lightning strike.

FIG. 3 is a flowchart depicting steps of the functioning of the circuit 30 of FIG. 2 following a lightning strike on the fence wire 44. Step 50 of the flowchart involves a lightning strike making contact with the fence wire 44. In turn, step 52 involves voltage being induced from the lightning to the fence wire 44 and secondary winding 42 of the transformer 34. Step 54 involves the induced voltage being stepped down onto the primary winding 38 of the transformer. Step 56 involves the matter of whether the stepped-down voltage is of a positive or negative polarity.

As described above, if the induced voltage is of a positive polarity, the current limiting means and diode represented in block 46 provide the protection for the energizer switch 36. In turn, in step 58, a balance of the induced voltage from the primary winding occurs between the current limiting means and diode combination of block 46 and the energizer switch 36. From the circuit design of block 46 and its connection within the circuit 30 as described above, while voltage begins to develop on the current limiting means of block 46, voltage also develops across the energizer switch 36. As a result of this sharing of the voltage, the peak current in the diode of block 46 is lowered. As should be appreciated, the value of the current limiting means of block 46 can be carefully preselected for a contemplated maximum level of stepped-down induced voltage stemming from a given voltage strike. Consequently, a balance can be established such that the energizer switch 36 starts to over-voltage at approximately the same time the diode of block 46 starts to over-current for a given level of induced voltage from the fence wire 44.

Conversely, if the induced voltage is of a negative polarity, the current limiting means and diode represented in block 48 provide the protection for the energizer switch 36. In turn, in step 60, a balance of the induced voltage from the primary winding occurs between the current limiting means and diode combination of block 48 and the energizer switch 36. Similar to that described above with respect to the circuit design and functioning of the current limiting means and the diode of block 46, from the circuit design of block 48 and its connection within the circuit 30, voltage begins to develop on the current limiting means of block 48 as well as across the energizer switch 36. As a result of this sharing of the voltage, the peak current in the diode of block 48 is lowered. Similar to the current limiting means of block 46, the value of the current limiting means of block 48 can be carefully preselected for a contemplated maximum level of stepped-down induced voltage stemming from a given voltage strike. Consequently, a balance can be established such that the energizer switch 36 starts to over-voltage at approximately the same time the diode of block 48 starts to over-current for a given level of induced voltage from the fence wire 44.

Thus, even though there is some potential for the diodes of either block 46 or block 48 to fail due to excessive current levels, the potential is largely decreased by the collective sharing of the induced voltage across the corresponding current limiting means and the energizer switch 36, which in turn, lowers the level of current passing through the corresponding diode. In addition, due to the excessive currents that are drawn to these diodes of either block 46 or 48 (depending on the polarity of the induced voltage), the amount of voltage that is placed across the energizer switch 36 is limited. This collective sharing in protective function of the circuit 30 between the current limiting means/diode combinations of blocks 46 and 48 as well as the energizer switch 36 allows for a cost effective solution for overvoltage protection with significant increase in the level of protection compared to other known and conventionally-used circuit options described above.

Figure 4:
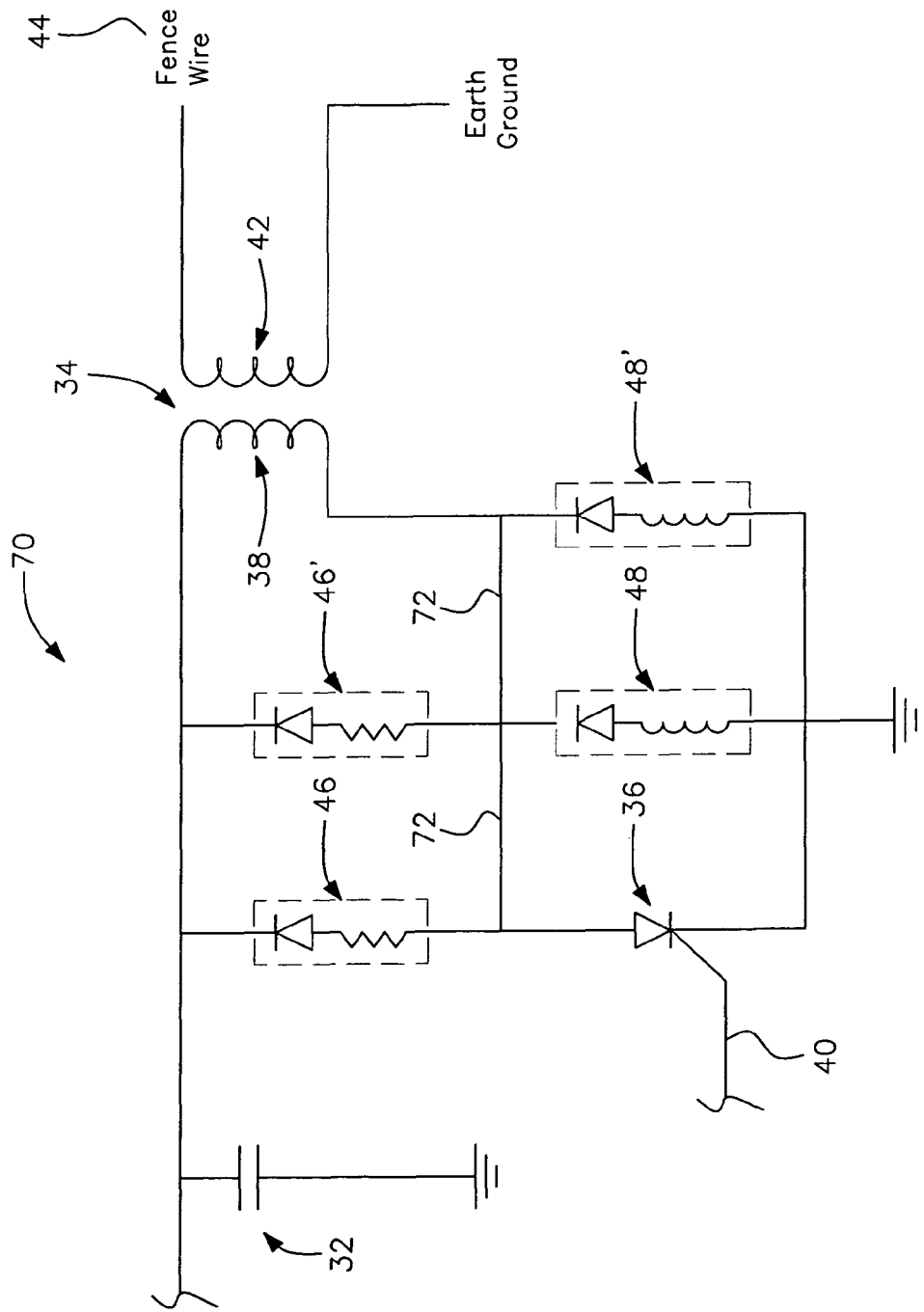
FIG. 4 is another partial diagram of a fence energizer circuit in accordance with certain embodiments of the invention.

It should be appreciated that depending on the level of protection desired, different configurations of the circuit 30 of FIG. 2 may be provided without departing from the scope of the invention. For example, in some cases, only one of blocks 46 and 48 may be provided. It should also be appreciated that the circuit 30 of FIG. 2 may be modified to offer greater protection through the use of further current limiting means/diode combinations positioned across both the primary winding 38 of the transformer 34 and the energizer switch 36. FIG. 4 illustrates such a fence energizer circuit in accordance with certain embodiments of the invention. As shown, the fence energizer circuit 70 of FIG. 4 is similar in structure and electrical connection as the circuit 30 of FIG. 2, but for an additional current limiting means/diode combination positioned across each of the primary winding 38 of the transformer 34 (with connection to node 72) and the energizer switch 36 (also with connection to node 72), respectively represented as blocks 46' and 48'. As should be appreciated, when voltage is induced through the transformer 34, depending on the polarity of the voltage, the voltage is further distributed across both current limiting means of either blocks 46 and 46' or blocks 48 and 48', thereby further limiting the peak currents seen by the corresponding diodes of blocks 46 and 46' or 48 and 48'.

It will be appreciated the embodiments of the present invention can take many forms. The true essence and spirit of these embodiments of the invention are defined in the appended claims, and it is not intended the embodiment of the invention presented herein should limit the scope thereof.

What is claimed is:

1. A lightning protection circuit for an electric fence energizer circuit of an electrical fencing system comprising:
    a step-up transformer having a primary winding and a secondary winding, the secondary winding operatively connected to a fence wire of the fencing system;
    a storage capacitor on one end sharing an operative connection to the primary winding of the transformer and an input of the electric fence energizer circuit that is operatively connected to a power source;
    a switch operatively connected to the primary winding of the transformer, the switch when open facilitating the storage capacitor to charge via its operative connection to the power source, the switch when closed facilitating the storage capacitor to discharge its stored voltage across the primary winding; and
    a protective combination comprised of at least two electrical components connected in series, the protective combination sharing with the switch the operative connection to the primary winding of the transformer, a first of the electrical components configured to draw a majority of current therethrough and away from the switch when voltage on the primary winding of the transformer is induced from a lightning strike on the fence wire, a second of the electrical components configured to share the induced voltage with the switch, thereby reducing peak levels of the current drawn by the first electrical component, said induced voltage being one of a positive or negative polarity; and
    said protective combination including at least two protective combinations that are operatively connected in parallel with each other and with one of the primary winding of the transformer or the switch for protecting the circuit from the one polarity of the induced voltage.

2. The lightning protection circuit of claim 1 wherein the first electrical component comprises a diode.

3. The lightning protection circuit of claim 1 wherein the second electrical component comprises a current limiting means.

4. The lightning protection circuit of claim 3 wherein the current limiting means comprises one or more of at least one resistor and at least one inductor.

5. The lightning protection circuit of claim 1 wherein the combinations are operatively connected in parallel with each other and with the primary winding of the transformer for protecting the circuit from the one polarity of the induced voltage.

6. The lightning protection circuit of claim 1 wherein the protective combinations are operatively connected in parallel with each other and with the switch for protecting the circuit from the one polarity of the induced voltage.

7. The lightning protection circuit of claim 1 wherein the protective combinations include a first protective combination and a second protective combination, said first protective combination being operatively connected in parallel with the primary winding of the transformer for protecting the fence energizer circuit from one polarity of the induced voltage and wherein the second protective combination is operatively connected in parallel with the switch for protecting the fence energizer circuit from a polarity opposite the one polarity of the induced voltage.

8. The lightning protection circuit of claim 7 wherein the one polarity comprises the positive polarity.

9. The lightning protection circuit of claim 1 wherein the switch is a silicon controlled rectifier.

10. The lighting protection circuit of claim 1, wherein the switch is operatively connected to a timer for controlling activation scheduling of the switch.

11. A lightning protection circuit for an electric fence energizer circuit of an electrical fencing system comprising:
    a step-up transformer having a primary winding and a secondary winding, the secondary winding operatively connected to a fence wire of a fencing system;
    a storage capacitor on one end sharing an operative connection to the primary winding of the transformer and an input of the electric fence energizer circuit that is operatively connected to a power source;
    a switch electrically connected to the primary winding of the transformer, the switch when open facilitating the capacitor to charge via its operative connection to the power source, the switch when closed facilitating the capacitor to discharge its stored voltage across the primary winding; and
    a protective combination comprised of at least two electrical components connected in series, the protective combination sharing with the switch the operative connection to the primary winding of the transformer, a first of the electrical components configured to draw a majority of current therethrough when voltage on the primary winding of the transformer is induced from a lightning strike on the fence wire, a second of the electrical components configured to share the induced voltage with the switch, the second electrical component sized so that the switch begins to overvoltage at approximately the same time the first electrical component begins to overcurrent, thereby creating a balanced protective functioning of the circuit following lightning strikes contacting the fence wire.

12. The lightning protection circuit of claim 11 wherein the first electrical component comprises a diode.

13. The lightning protection circuit of claim 11 wherein the second electrical component comprises a current limiting component.

14. The lightning protection circuit of claim 13 wherein the current limiting component includes one or more of at least one resistor and at least one inductor.

15. The lightning protection circuit of claim 11 wherein the induced voltage is one of a positive or negative polarity.

16. The lightning protection circuit of claim 15 wherein the protective combination is operatively connected in parallel with the primary winding of the transformer for protecting the circuit from one polarity of the induced voltage.

17. The lightning protection circuit of claim 16 wherein the protective combination comprises at least two protective combinations, wherein the at least two protective combinations are operatively connected in parallel with each other and with the primary winding of the transformer for protecting the circuit from the one polarity of the induced voltage.

18. The lightning protection circuit of claim 15 wherein the protective combination is operatively connected in parallel with the switch for protecting the circuit from one polarity of the induced voltage.

19. The lightning protection circuit of claim 18 wherein the protective combination comprises at least two protective combinations, wherein the at least two protective combinations are operatively connected in parallel with each other and with the switch for protecting the circuit from the one polarity of the induced voltage.

20. The lightning protection circuit of claim 15 wherein the protective combination comprises a first protective combination and a second protective combination, the first protective combination being operatively connected in parallel with the primary winding of the transformer for protecting the fence energizer circuit from one polarity of the induced voltage and the second protective combination being operatively connected in parallel with the switch for protecting the fence energizer circuit from a polarity opposite the one polarity of the induced voltage.

21. The lightning protection circuit of claim 20 wherein the one polarity comprises the positive polarity.

22. The lightning protection circuit of claim 11 wherein the switch is a silicon controlled rectifier.

23. The lighting protection circuit of claim 11, wherein the switch is operatively connected to a timer for controlling activation scheduling of the switch.

24. A method of protecting an electric fence energizer circuit from lighting strikes, the steps comprising:
   operatively connecting a secondary winding of a step-up transformer to a fence wire of an electric fencing system;
   operatively connecting a storage capacitor on one end to a primary winding of the transformer and an input of the circuit that is operatively connected to a power source;
   operatively connecting a switch to the primary winding of the transformer, the switch when open facilitating the capacitor to charge via its operative connection to the power source, the switch when closed facilitating the capacitor to discharge its stored voltage across the primary winding; and
   operatively connecting a protective combination so as to share with the switch the operative connection to the primary winding of the transformer, the protective combination comprised of at least two electrical components connected in series, a first of the electrical components configured to draw a majority of current therethrough when voltage on the primary winding of the transformer is induced from a lightning strike on the fence wire, a second of the electrical components configured to share the induced voltage with the switch, the second electrical component sized so that the switch begins to overvoltage at about the same time the first electrical component begins to overcurrent, thereby creating a balanced protective functioning of the circuit following lightning strikes contacting the fence wire.

* * * * *